(12) United States Patent
Håkansson et al.

(10) Patent No.: US 12,127,088 B2
(45) Date of Patent: Oct. 22, 2024

(54) OVER-THE-TOP MANAGEMENT IN A COMMUNICATION NETWORK

(71) Applicant: TELEFONAKTIEBOLAGET LM ERICSSON (PUBL), Stockholm (SE)

(72) Inventors: Stefan Håkansson, Gothenburg (SE); Hans Mattsson, Mölndal (SE); Linus Andersson, Gothenburg (SE); David Del Peral Chico, Madrid (ES); Alfonso De Jesus Perez Martinez, Madrid (ES); Miguel Angel Muñoz De La Torre Alonso, Madrid (ES); Rodrigo Alvarez Dominguez, Madrid (ES); Göran Eriksson, Norrtälje (SE); Marcos Caballero Del Dedo, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/611,698

(22) PCT Filed: Aug. 26, 2019

(86) PCT No.: PCT/EP2019/072703
§ 371 (c)(1),
(2) Date: Nov. 16, 2021

(87) PCT Pub. No.: WO2020/228968
PCT Pub. Date: Nov. 19, 2020

(65) Prior Publication Data
US 2022/0201090 A1    Jun. 23, 2022

(30) Foreign Application Priority Data
May 16, 2019 (EP) .................................. 19382387

(51) Int. Cl.
*H04L 67/56* (2022.01)
*H04L 12/66* (2006.01)
(Continued)

(52) U.S. Cl.
CPC ............... *H04W 4/50* (2018.02); *H04L 12/66* (2013.01); *H04L 67/02* (2013.01)

(58) Field of Classification Search
CPC ....... H04W 8/16; H04W 8/183; H04W 36/12; H04W 48/18; H04W 8/12; H04L 61/4511; H04L 67/02
See application file for complete search history.

(56) References Cited

U.S. PATENT DOCUMENTS 7,072,651 B2 *   7/2006   Jiang ..................... H04W 48/18
                                                         455/432.1
9,049,646 B2 *   6/2015   Al-Khudairi ......... H04W 48/16
(Continued)

FOREIGN PATENT DOCUMENTS

| EP | 2724490 B1 | 4/2019 |
|----|------------|--------|
| WO | 2013117221 A1 | 8/2013 |
| WO | 2019/195776 A1 | 10/2019 |

OTHER PUBLICATIONS

3GPP TR 23.787 V0.4.0, "3rd Generation Partnership Project; Technical Specification Group Services and System Aspects; Study on encrypted traffic detection and verification (Release 16)", 3GPP TR 23.787 V0.4.0, Jun. 2018.
(Continued)

*Primary Examiner* — Chirag R Patel
(74) *Attorney, Agent, or Firm* — Sonoda & Kobayashi Intellectual Property Law; Sarvajit S. Patil

(57) ABSTRACT

A method for over-the-top, OTT, management in a communication network is presented. The method is performed in a packet data network gateway, PGW. The method com-
(Continued)

prises receiving (S200) a request for an application network interaction protocol, ANIP, service from an application client, sending (S210) the received request to a global ANIP server, wherein the request is extended with a public land mobile network, PLMN, identity, receiving (S220) an address to a local ANIP server from the global ANIP server, and sending (S230) the received address to the local ANIP server to the Send request for application client. Methods, a PGW, an application client, an ANIP server, computer programs, and a ANIP service computer program product for OTT management in a communication network are also presented.

26 Claims, 10 Drawing Sheets

(51) Int. Cl.
*H04L 67/02* (2022.01)
*H04W 4/50* (2018.01)

(56) References Cited

U.S. PATENT DOCUMENTS

| | | | | |
|---|---|---|---|---|
| 9,560,517 | B2* | 1/2017 | Keller | H04W 12/088 |
| 10,721,320 | B2* | 7/2020 | Wang | H04L 65/40 |
| 11,089,534 | B2* | 8/2021 | Jun | H04W 40/20 |
| 11,272,351 | B2* | 3/2022 | Palanigounder | H04W 12/0431 |
| 2017/0105155 | A1* | 4/2017 | Zhao | H04W 36/12 |
| 2017/0223054 | A1 | 8/2017 | Wing et al. | |
| 2019/0052603 | A1 | 2/2019 | Wu | |
| 2019/0372943 | A1* | 12/2019 | Stephan | H04L 63/0823 |
| 2020/0245163 | A1 | 7/2020 | Jaya et al. | |

OTHER PUBLICATIONS

3Gpp TS 23.203 V14.5.0, "3rd Generation Partnership Project; Technical Specification Group Services and System Aspects; Policy and charging control architecture (Release 14)", 3GPP TS 23.203 V14.5.0, Sep. 2017.

* cited by examiner

OVER-THE-TOP MANAGEMENT IN A COMMUNICATION NETWORK

PRIORITY CLAIM

This application is a national stage application of International Patent Application No. PCT/EP2019/072703, filed Aug. 26, 2019, which claims priority to European Patent Application No. 19382387.9, filed May 16, 2019, the disclosures of which are hereby incorporated in their entirety by reference.

TECHNICAL FIELD

The present disclosure relates to methods, a packet data network gateway, an application client, an application network interaction protocol server, computer programs and a computer program product for over-the-top management in a communication network.

BACKGROUND

For differentiation of services running in an operator's network, the services have to be identified. The identification is done with packet inspection inside a deep packet inspection (DPI) module or similar within the operator domain. A DPI module may also be called a packet inspection classification engine. To identify services, service definitions such as server internet protocol (IP) addresses, hostnames, universal resource locators (URLs) or parts thereof are provisioned into the packet inspection classification engine. Today, service definitions are often handed over from the content provider that runs the service to the operator. The service definitions are then provisioned out to all packet inspection classification engines inside the operator's network. There is work ongoing in third generation partnership project (3GPP) Rel14 standardization to support provisioning of large amount of service definitions.

The existing solutions are based on local provisioning of the service definitions in the PGW/policy and charging enforcement function (PCEF) or traffic detection function (TDF). Recently, a solution to provision service definitions from over-the-top (OTT) has been standardized in 3GPP Rel14 sponsored data connectivity improvements (SDCI). However, this solution is for semi-static use and a more dynamic solution is not available.

SUMMARY

One objective is to provide dynamic provisioning of service definitions in a communication network.

Information transfer between an operator and over-the-top (OTT) in a communication network, through a transport layer security (TLS) encrypted sideband protocol, allow support of e.g. zero-rating or quality of service (QoS) prioritization for OTT traffic. An operator can further notify OTT that a service is being applied properly.

According to a first aspect there is presented a method for OTT management in a communication network. The method is performed in a packet data network gateway (PGW). The method comprises receiving a request for an application network interaction protocol (ANIP) service from an application client, sending the received request to a global ANIP server, wherein the request is extended with a public land mobile network (PLMN) identity, receiving an address to a local ANIP server from the global ANIP server, and sending the received address to the local ANIP server to the application client.

The received request may be a hypertext transfer protocol secure (HTTPS) request message.

The request may comprise a TLS ClientHello with a generic server name identification, SNI, extension.

The received address to the local ANIP server may comprises an HTTPS redirection message to a unique SNI corresponding to an application provider.

The received request may be addressed to the global ANIP server.

According to a second aspect there is presented a method for OTT management in a communication network. The method is performed in an application client. The method comprises sending a request for an ANIP service to a PGW, wherein the request is addressed to a global ANIP server, receiving an indication of an address to a local ANIP server for the requested ANIP service from the PGW, and resending the request for the ANIP service to the PGW, wherein the request is addressed to the local ANIP server.

The request may be an HTTPS request message.

The request may comprise a TLS ClientHello with a generic SNI extension.

The received address to the local ANIP server may comprise an HTTPS redirection message to a unique SNI corresponding to an application provider.

According to a third aspect there is presented a method for OTT management in a communication network. The method is performed in an ANIP server. The method comprises receiving a request for an ANIP service from a PGW, the request extended with a PLMN identity, authorizing the request, and sending an indication of an address to a local ANIP server for the ANIP service to the PGW, in response to the received request.

The received request may be an HTTPS request message.

The indication of the address to the local ANIP server may comprise an HTTPS redirection message to a unique SNI corresponding to an application provider.

According to a fourth aspect there is presented a PGW for OTT management in a communication network. The PGW comprises a processing circuitry and a computer program product storing instructions. The stored instructions, when executed by the processing circuitry, causes the PGW to receive a request for an ANIP service from an application client, send the received request to a global ANIP server, wherein the request is extended with a PLMN identity, receive an address to a local ANIP server from the global ANIP server, and to send the received address to the local ANIP server to the application client.

The received request may be an HTTPS request message.

The request may comprise a TLS ClientHello with a generic SNI extension.

The received address to the local ANIP server may comprises an HTTPS redirection message to a unique SNI corresponding to an application provider.

The received request may be addressed to the global ANIP server.

According to a fifth aspect there is presented an application client for OTT management in a communication network. The application client comprises a processing circuitry and a computer program product storing instructions. The stored instructions, when executed by the processing circuitry, causes the application client to send a request for an ANIP service to a PGW, wherein the request is addressed to a global ANIP server, receive an indication of an address to a local ANIP server for the requested ANIP service from the PGW, and to resend the request for the ANIP service to the PGW, wherein the request is addressed to the local ANIP server.

The request may be an HTTPS request message.

The request may comprise a TLS, ClientHello with a generic SNI extension.

The received address to the local ANIP server may comprise an HTTPS redirection message to a unique SNI corresponding to an application provider.

According to a sixth aspect there is presented an ANIP server for OTT management in a communication network. The ANIP server comprises a processing circuitry and a computer program product storing instructions. The instructions, when executed by the processing circuitry, causes the ANIP server to receive a request for an ANIP service from a PGW, the request extended with a PLMN identity, authorize the request, and to send an indication of an address to a local ANIP server for the ANIP service to the PGW, in response to the received request.

The received request may be an HTTPS request message.

The indication of the address to the local ANIP server may comprises an HTTPS redirection message to a unique SNI corresponding to an application provider.

According to a seventh aspect there is presented a computer program for OTT management in a communication network. The computer program comprises computer program code which, when run in a PGW of a radio communication network, causes the PGW to receive a request for an ANIP service from an application client, send the received request to a global ANIP server, wherein the request is extended with a PLMN identity, receive an address to a local ANIP server from the global ANIP server, and to send the received address to the local ANIP server to the application client.

According to an eighth aspect there is presented a computer program for OTT management in a communication network. The computer program comprises computer program code which, when run in a client application of a radio communication network, causes the client application to send a request for an ANIP service to a PGW, wherein the request is addressed to a global ANIP server, receive an indication of an address to a local ANIP server for the requested ANIP service from the PGW, and to resend the request for the ANIP service to the PGW, wherein the request is addressed to the local ANIP server.

According to a ninth aspect there is presented a computer program for OTT management in a communication network. The computer program comprises computer program code which, when run in an ANIP server of a radio communication network, causes the ANIP server to receive a request for an ANIP service from a PGW, the request extended with a PLMN identity, authorize the request, and to send an indication of an address to a local ANIP server for the ANIP service to the PGW, in response to the received request.

A computer program product comprising a computer program and a computer readable storage means on which the computer program is stored is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
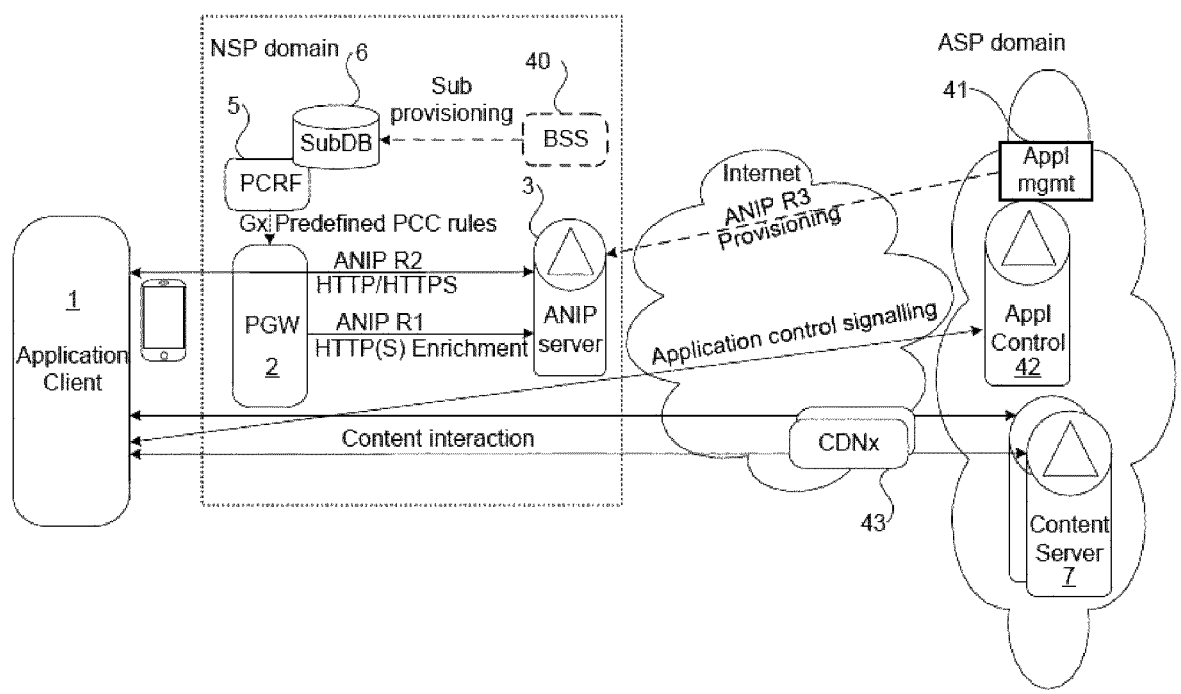
FIG. 1 is a diagram schematically illustrating an ANIP based architecture.

FIG. 1 schematically illustrates an application network interaction protocol (ANIP) based architecture wherein embodiments presented herein can be applied.

Examples presented herein are based on a user equipment (UE) properly connected to a mobile network, in which there will be a node with deep packet inspection (DPI) and service classification functionality through a packet data network gateway (PGW), and an implemented ANIP server (e.g. using a web server). Deployment of the ANIP server may either be inside the mobile network (as illustrated in FIG. 1) or on public internet (not illustrated). Over-the-top (OTT) endpoints are e.g. content servers.

UE (More Precisely ANIP Client)

Before generating some kind of traffic that are to be classified by the PGW 2, the ANIP client 1 wants to know if that traffic has dedicated rules (e.g. for zero-charging or special quality of service (QoS)) due to the UE and its application client 1 belonging to a particular OTT with an ANIP server 3 installed. The application client 1 can receive information about dedicated rules from the ANIP server 3.

PGW

DPI and service classification operation requires updated rules from an ANIP server 3 to classify the traffic from an application client 1 properly, to apply e.g. desired QoS or charging. These updated rules are generated dynamically using ANIP server information. Moreover, the PGW 2 needs to enrich uplink packets with useful information for the ANIP server 3 or OTTs 7, 41, 42. A content enrichment feature may e.g. be used with hyper transfer text protocol (HTTP) headers. Communication between the PGW 2 and the ANIP server 3 may be via ANIP R1 and R2

ANIP Server

The ANIP server 3 contains updated information directly from OTTs for classification, and receives enriched packets saving added information as well. The ANIP server 3 needs to send downlink packets with the updated information (e.g. into an HTTP header called anip-basic-rule-block) and additional headers with useful data for an application client 1 or an PGW 2.

OTT Endpoints

The endpoints the OTT application in the application client 1 communicates with may get special treatment, such as zero-charging or QoS, once the application client 1 has contacted the ANIP server 3 and the PGW 2 has updated the rules. Examples of OTT endpoints are content servers 7 (from where e.g. video for off line consumption is downloaded, or from where video is streamed), web application servers, traversal using relays network address translation (TURN) servers (for e.g. a WebRTC communication session), other UE application clients (peer to peer communication, e.g. using WebRTC). Application traffic is the traffic between the OTT application in the application client 1 and the OTT endpoint(s) 7, 41, 42.

Network Service Plane (NSP) Domain

Policy Control Resource Function (PCRF) 5 communicates policy and charging control (PCC) rules to the PGW 2, e.g. via interface Gx. Subscription Database (SubDB) 6 serves the PCRF 5. The PCRF 5 and SubDB 6 may further receive subscription provisioning from a business support system (BSS) 40.

Application Service Plane (ASP) Domain

The application provider management (Appl mgmt) 41 function is responsible for provisioning needed application related information to the NSP, e.g. via ANIP R3. Application control (Appl control) function 42 handles application control signalling with the application client 1 and offers services supporting the application client logic as presented to a specific user.

The content delivery network (CDN) 43 is used for efficient delivery of application content (e.g. video streams) to the client application. The x in CDNx denotes that different CDNs can be provided from different vendors.

Figure 2:
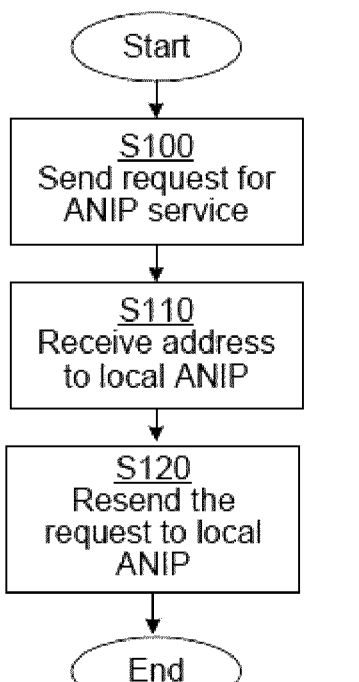
FIGS. 2-4 are flowcharts schematically illustrating embodiments of methods as presented herein.

According to an aspect, an embodiment of a method for OTT management in a communication network is presented with reference to FIG. 2. The method is performed in an application client. In processing block S100 the application client sends a request for an ANIP service to a PGW. The request is addressed to a global ANIP server. In processing block S110 the application client receives an indication of an address to a local ANIP server for the requested ANIP service from the PGW. In processing block S120 the application client resends the request for the ANIP service to the PGW. The request is addressed to the local ANIP server.

The request may be an HTTP secure (HTTPS) request message.

The request may comprise a transport layer security (TLS) ClientHello with a generic server name identification, SNI, extension.

The received address to the local ANIP server may comprise an HTTPS redirection message to a unique SNI corresponding to an application provider.

Figure 3:
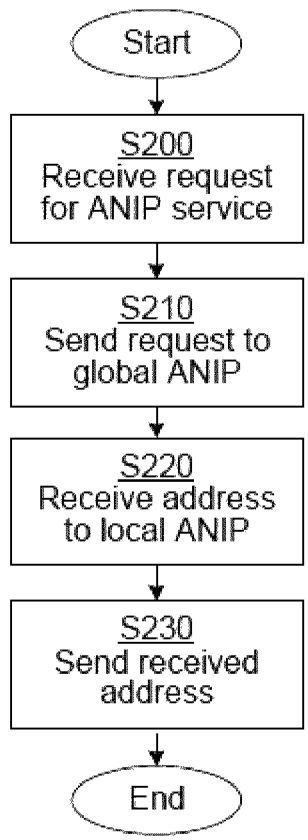

According to an aspect, an embodiment of a method for OTT management in A COMMUNICATION NETWORK IS PRESENTED WITH REFERENCE TO FIG. 3. THE METHOD IS performed in a PGW. In processing block S200 the PGW receives a request for an ANIP service from an application client. In processing Nock S210 the PGW sends the received request to a global ANIP server. The request is extended with a public land mobile network (PLMN) identity. In processing block S220 the PGW receives an address to a local ANIP server from the global ANIP server. In processing block S230 the PGW sends the received address to the local ANIP server to the application client.

The received request may be an HTTPS request message.

The request may comprise a TLS ClientHello with a generic SNI extension.

The received address to the local ANIP server may comprise an HTTPS redirection message to a unique SNI corresponding to an application provider.

The received request may be addressed to the global ANIP server.

Figure 4:
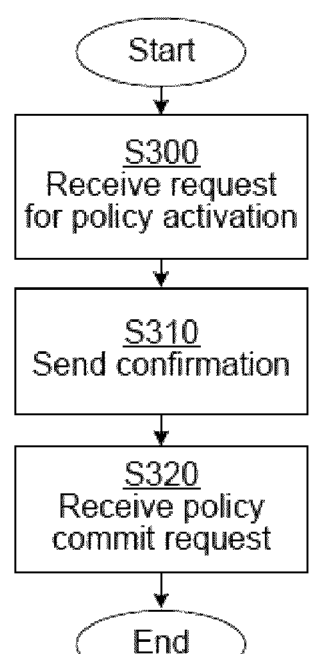

According to an aspect, an embodiment of a method for OTT management in a communication network is presented with reference to FIG. 4. The method is performed in an ANIP server. In processing block S300 the ANIP server receives a request for an ANIP service from a PGW. The request is extended with an PLMN identity. In processing block S310 the ANIP server authorizes the request. In processing block S320 the ANIP server sends an indication of an address to a local ANIP server for the ANIP service to the PGW, in response to the received request.

The received request may be an HTTPS request message.

The indication of the address to the local ANIP server may comprise an HTTPS redirection message to a unique SNI corresponding to an application provider.

The operations shown in FIGS. 2-4 will now be illustrated and described in more detail in conjunction with FIGS. 5-9.

Figure 5:
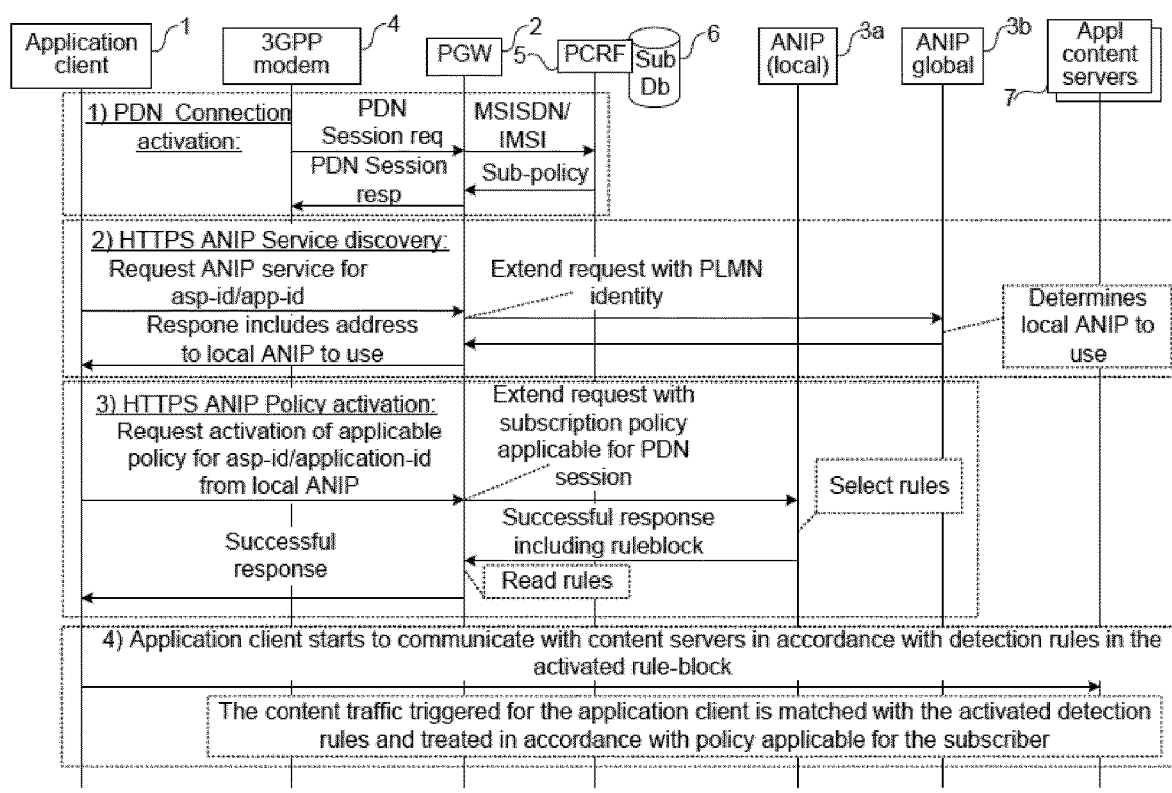
FIGS. 5-7 ARE SEQUENCE DIAGRAMS SCHEMATICALLY ILLUSTRATING POLICY ACTIVATION flows according to embodiments presented herein.

FIG. 5 is a sequence diagram schematically illustrating four process operations: 1) packet data network (PDN) connection activation, 2) HTTPS ANIP service discovery, 3) HTTPS ANIP policy activation, and 4) communication.

PDN Connection Activation

A 3GPP modem 4 of a UE wherein an application client 1 is installed, sends a PDN session request (req) to a PGW 2. In response to the received session request the PGW 2 sends a mobile station integrated services digital network (MSISDN)/international mobile subscriber identity (IMSI) to a PCRF 5. The PCRF 5 look up the MSISDN/IMSI in its subscription (sub) database (db) 6, and returns a subscription policy (sub-policy) for the PDN session. The PGW 2 in response to the received sub-policy returns a PDN session response (resp) to the 3GPP modem 4.

HTTPS ANIP Service Discovery

The application client 1 request an ANIP service for an asp-id/app-id of the PGW 2. The PGW 2 extends the request with the PLMN identity of the application client 1 and sends the extended request to a global ANIP 3b. The global ANIP 3b determines a local ANIP 3a to use based on PLMN identity, asp-id and app-id, and sends the address back to the PGW 2. The PGW 2 in turn sends the response back to the application client 1, including an address to the local ANIP to use for the requested ANIP service.

HTTPS ANIP Policy Activation

The application client 1 sends a request for activation of applicable policy for the asp-id/app-id to the PGW 2, addressed to the local ANIP 3a. The PGW 2 extends the request with the subscription policy applicable, i.e. offered to the application client, for this PDN session to the local ANIP 3a. When the received subscription policy allows, the local ANIP 3a select rules needed to detect content traffic for the asp-id and app-id together with an applicable time-to-live (TTL) for those rules and includes them as a rule-block with a successful response returned destined to and readable by the PGW 2. The PGW 2 reads the rule-block and activate corresponding detection rules in the PDN-session user-plane for enforcement of matching traffic in accordance with the subscription policy. The PGW 2 sends a successful response back to the application client 1. The application client 1 now have polices applicable for the requested asp-id/app-id for the subscriber active on the PDN session for a TTL.

There are complexities with process operation 3) when HTTPS/TLS is being used, meaning that encryption and session integrity is negotiated directly between client and server. The PGW 2 can then not read the rule-block included in the response from the local ANIP 3a when it is included as HTTP content. If any data not encrypted in accordance with the TLS negotiation is inserted, it will be detected as a security breach by the application client 1. The PGW 2 can then not in the response directly add an indication whether the expected policy was properly activated or not.

A rule-block included as non-encrypted data from the local ANIP 3a to the PGW 2 in the response thus needs to be removed from the TLS-flow carrying the response in such a way that the rule-block isn't detected by TLS in the application client 1.

Communication

The application client 1 starts to communicate with content servers 7 in accordance with detected rules in the now active rule-block. The rule-block contains a list of possible content servers. The content traffic triggered for the application client 1 is matched in the PGW with the activated detection rules and treated in accordance with policy applicable for the subscriber.

Figure 6:
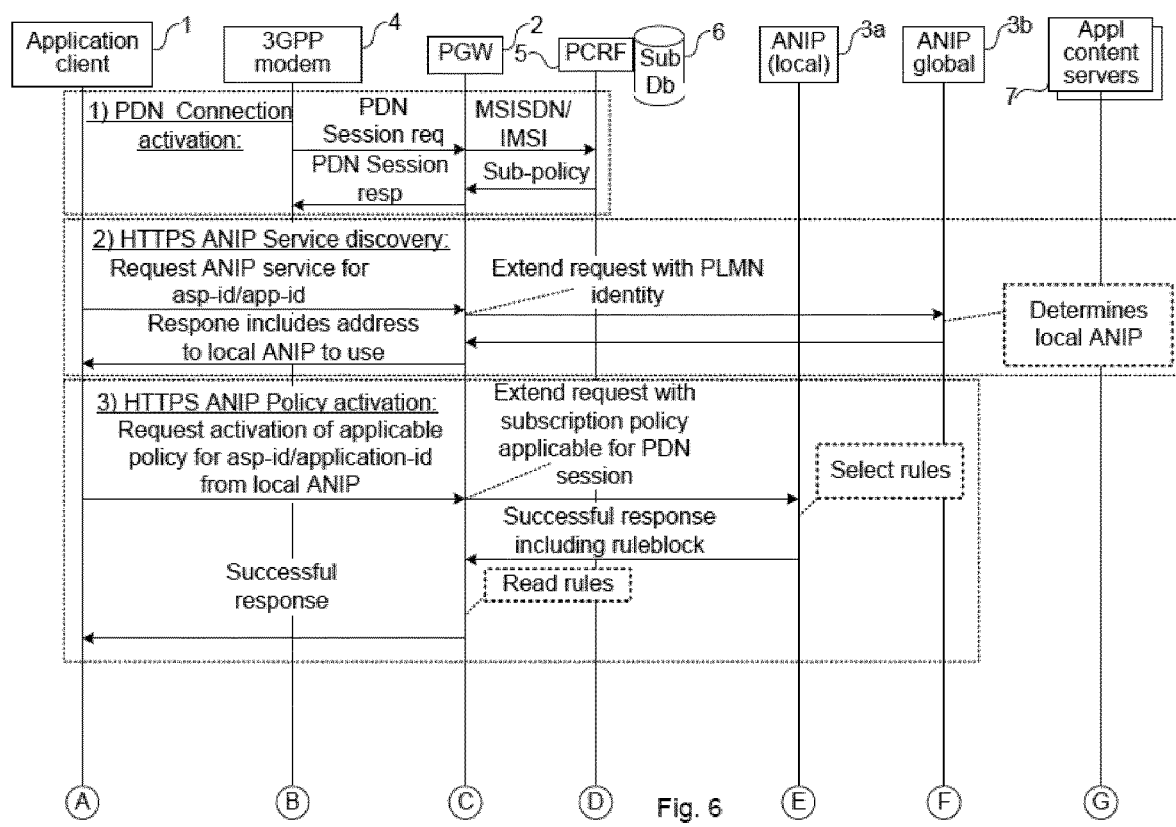
Figure 6:
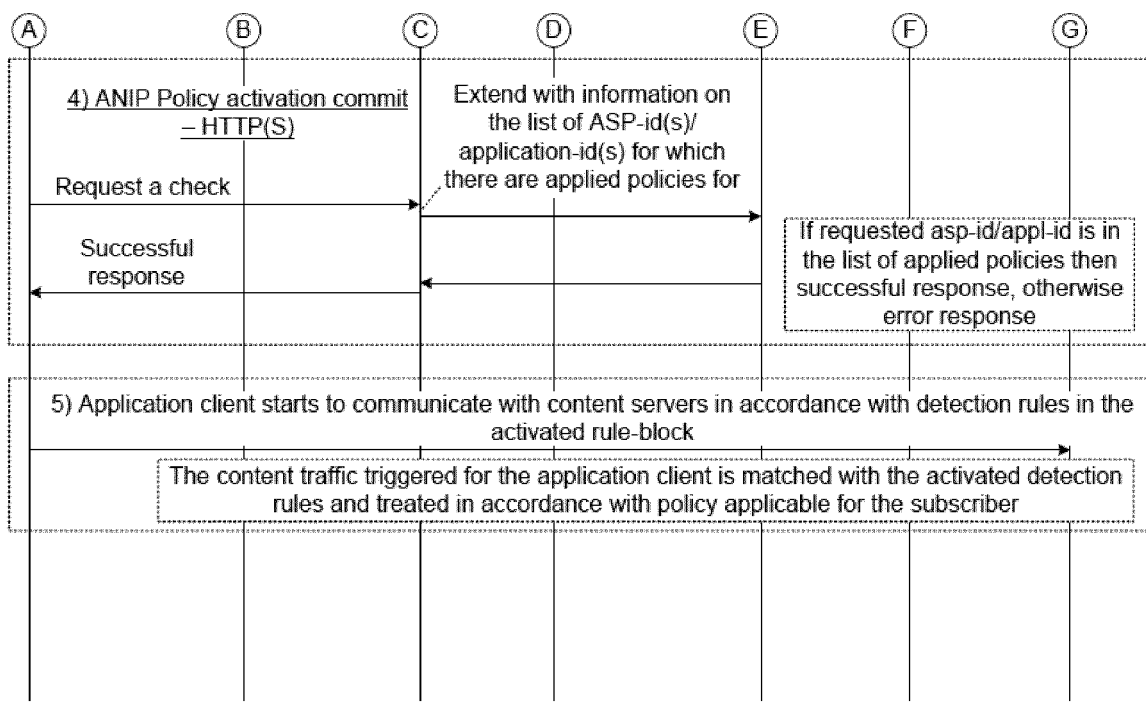

FIG. 6 is a sequence diagram schematically illustrating five process operations: 1) PDN connection activation, 2) HTTPS ANIP service discovery, 3) HTTPS ANIP policy activation, ANIP policy activation commit—HTTP(S), and 5) communication. Process operations 1), 2), and 3) similar to corresponding process operations described in connection with FIG. 5.

ANIP Policy Activation Commit—HTTP(S)

The application client 1 request a check on whether the applicable policy has been correctly applied, providing asp-id and app-id. The request is sent to the PGW 2. The PGW 2 extends the request with information of a list of asp-id(s)/app-id(s) for which there are applied policies for, and sends the extended request to the local ANIP 3a. The local ANIP 3a replies with a successful response when the requested asp-id/app-id is in the list of applied polices. The response again includes the rule-block. The PGW 2 confirms to the application client 1 that the check was successful.

Processing operation 5) is similar to corresponding process operation described in connection with FIG. 5.

The proposed embodiments provide a mechanism to support TLS application data manipulation in uplink and downlink being transparent to the UE, thus providing a way to transmit control information (e.g. using headers in HTTP over TLS) to a mobile network node from a simple server, camouflaging that information in the user plane. The proposed embodiments can also be used to confirm to UE the correct application of the changes previously ordered by an ANIP server and to avoid TCP header manipulation to keep up the connection.

TLS encrypted HTTP requests and responses cannot be read by a PGW, and application data cannot be written inside packets using encryption agreed between UE and ANIP server at the beginning of a TLS connection. The PGW is in this sense a middlebox and does not know the keys to decrypt them. Content enrichment features do not work in the same way as in cleartext HTTP.

A proprietary TLS part may be defined in the presented embodiments. For an uplink case, there are two possible solutions to insert data in a TLS message.

The first solution inserts extension-type and value as a new custom record attached to the TLS flow (application data record).

The second solution uses ClientHello message of the handshake. This message allows an extension part for adding extra data. It's possible to include the extension-type for filling the extension with enriched data. These extensions are not encrypted.

The ClientHello can be initiated at any time during an existing session and is not limited to just session initialization. A server application may request a new ClientHello periodically to request client authentication based on the resource that is requested. Either the application client or the server may request a new handshake to refresh encryption keys.

For the downlink case, a record content-type outside of the standard definition may be used. The record content-type may be used for containing the data from ANIP server to PGW. This data may be encrypted by using a shared key between the PGW and the ANIP server, based on certificate sniffed previously by PGW, or may be unencrypted like HTTP. The difference between an own record and a standard record is the content-type byte, i.e. an own value is used in this field to identify it.

In both the uplink case and the downlink case TLS handshake message Finished needs to be modified according to the change of record content-type outside of the standard definition applied above. The Finished message is sent from both peers (client and server) indicating that the TLS handshake has been completed and is used to verify that key exchange and all previous authentication processes were successful. The Finished message is a cryptographic checksum computed over all previous handshake messages (from both the client and server). Client and server send their own Finished messages. Therefore, when client and server receive that message, they verify its contents, and the client and server, respectively, obtains a proof that it has indeed communicated with the same peer all along. This message thus protects the handshake from alteration. It is not possible to modify the handshake messages and still get the Finished message right.

For TLS handshake purpose, an evolved package gateway (EPG) PGW can in uplink be considered as an attacker. The EPG modifies the handshake including a new extension in ClientHello that has not been added by the client. A TLS Finished message from the client will thus be different from the server. This could cause a fatal error and a TLS connection drop. Such a fatal error and connection drop can however be avoided by two alternatives.

The PGW may have access to private/public keys from the ANIP server. In this case the PGW can rewrite the Finished handshake including a new modified ClientHello messages. This is however resource demanding, since the PGW needs to keep modified ClientHello messages and to alter this message for every user.

The ANIP server may ignore such a fatal error and send a TLS Finished message like what the client has delivered. This is simpler although implies to call an openSSL library from a customized Secure Sockets Layer (SSL) socket.

There are in the same way two alternatives in downlink.

The PGW may extract a custom application record transparently to the client. Later, the ANIP server must remove this customer application record in the moment that the Finished message is generated.

The PGW may extract a custom application record and drop the packet. The ANIP server resets the TLS connection and the client will again initiate again the TLS handshake. This alternative is very simple with minimum resource requirement in the ANIP server, but a longer round-trip time (RTT) is introduced.

Figure 7:
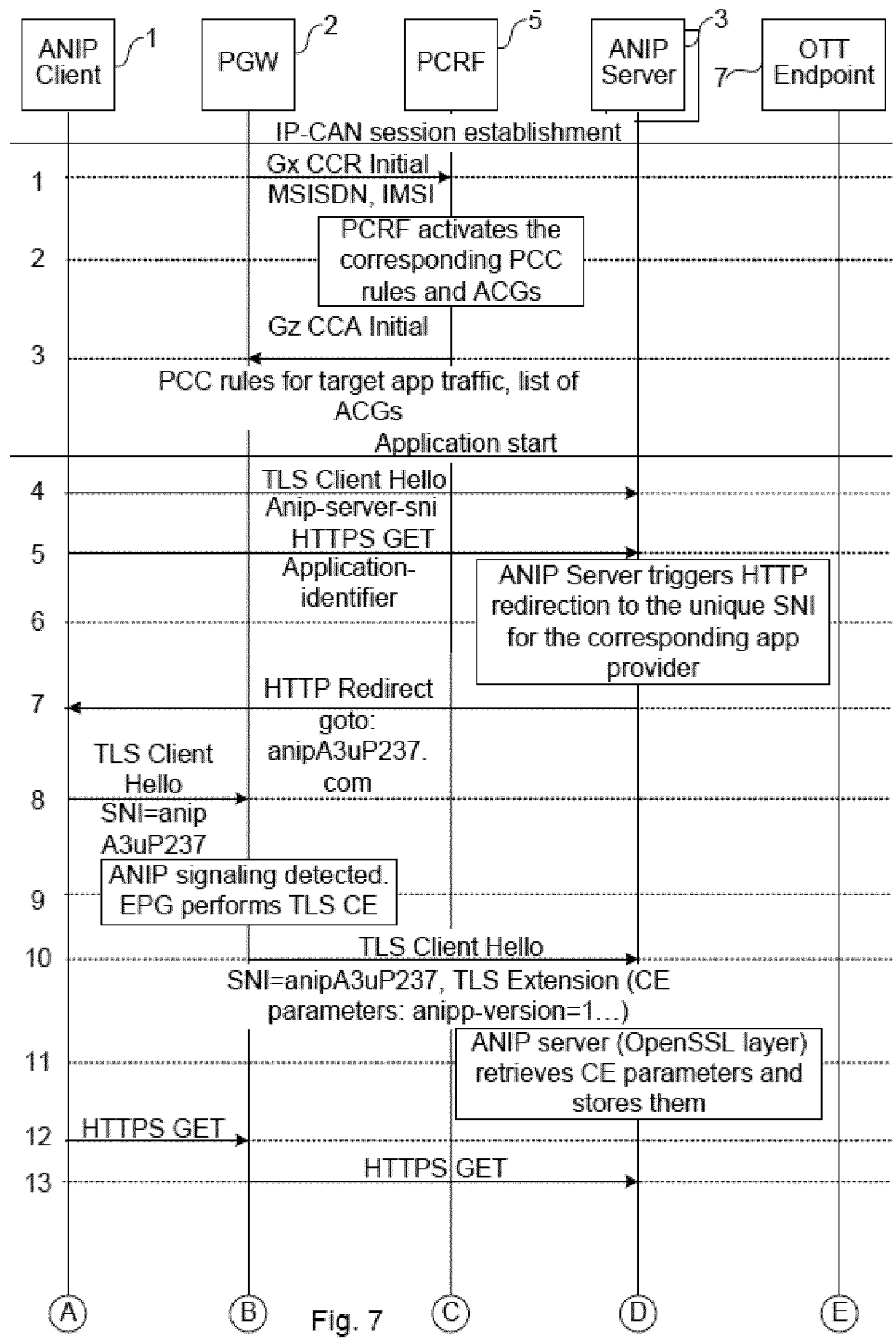
Figure 7:
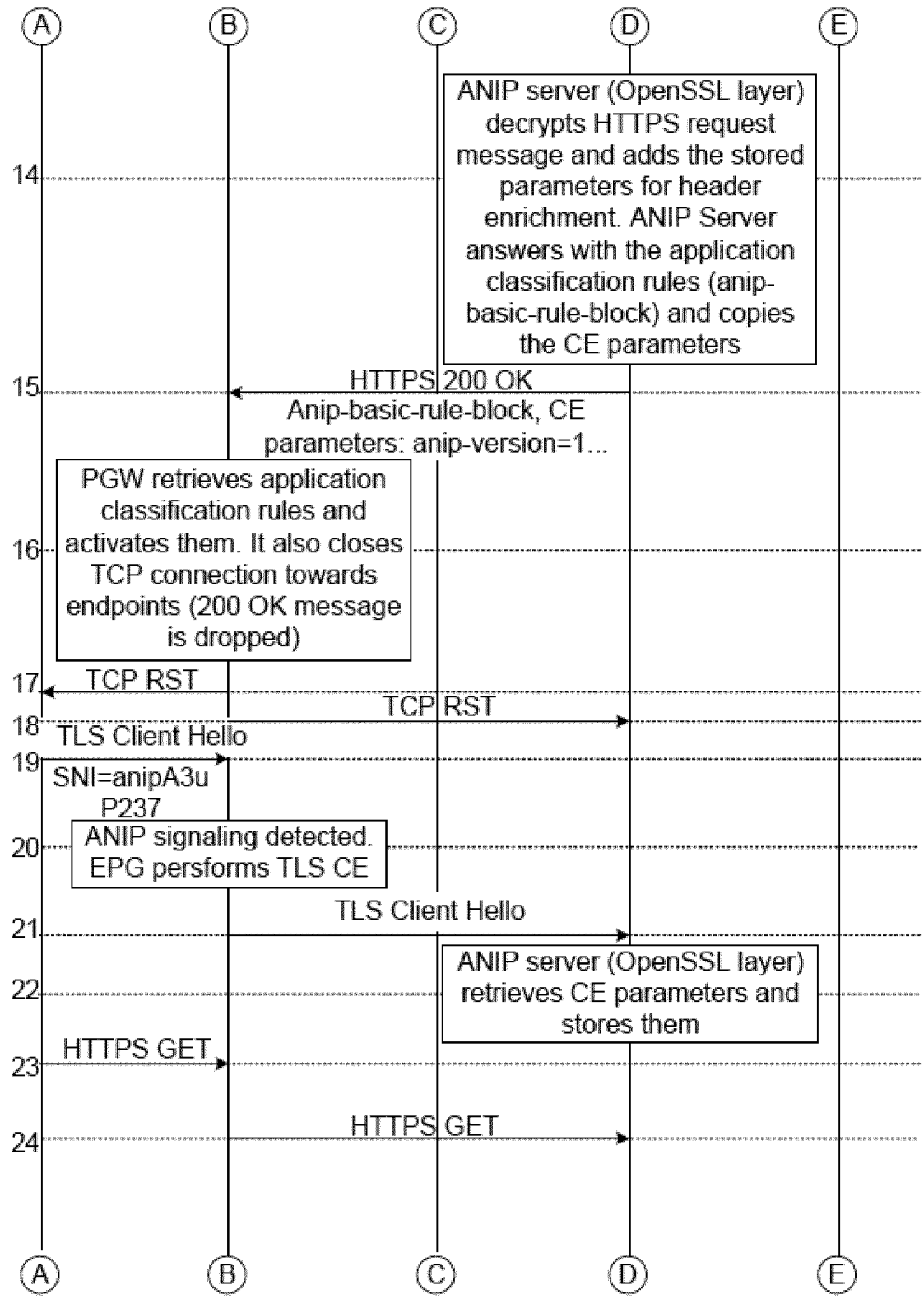
Figure 7:
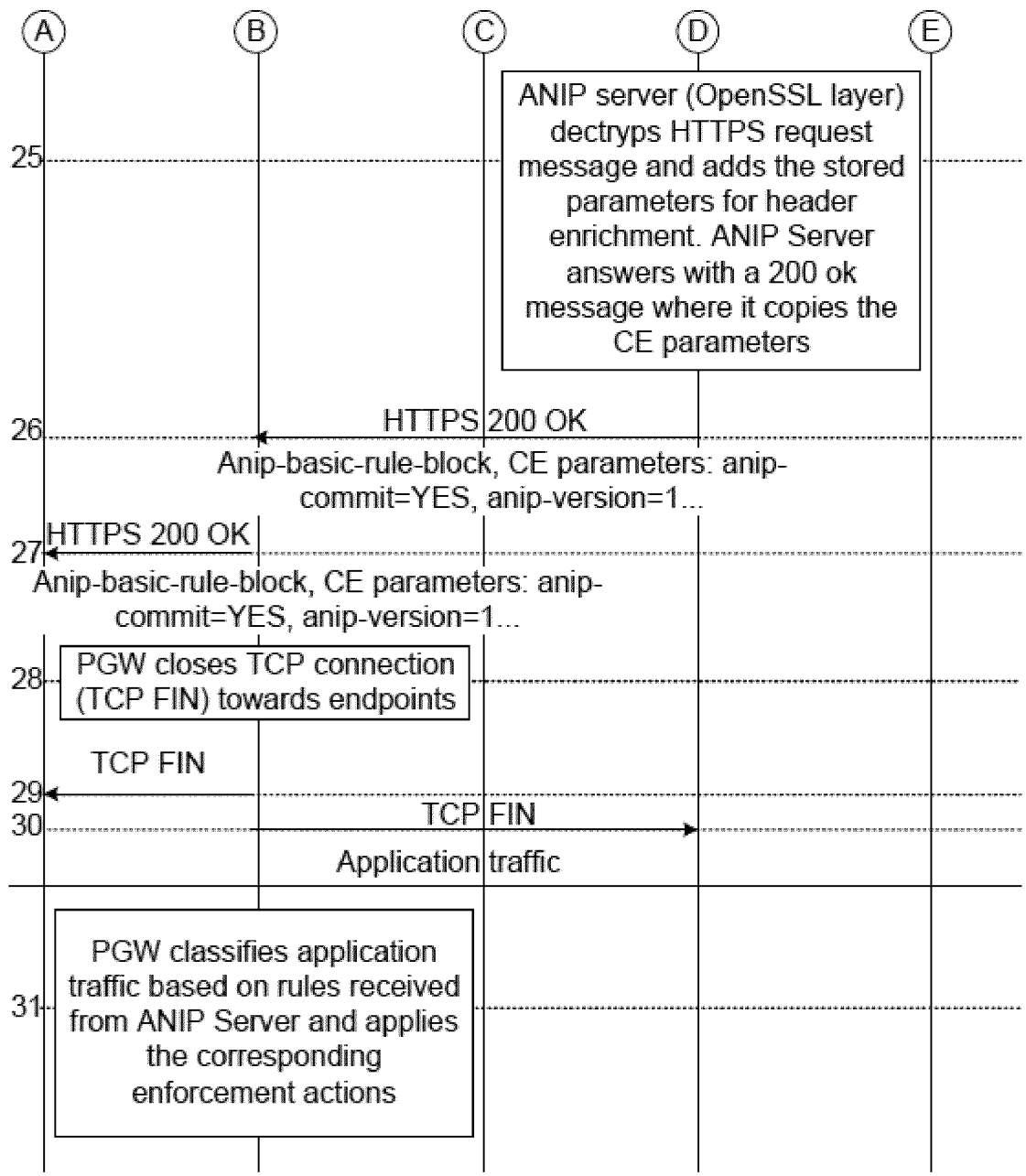
Figure 8:
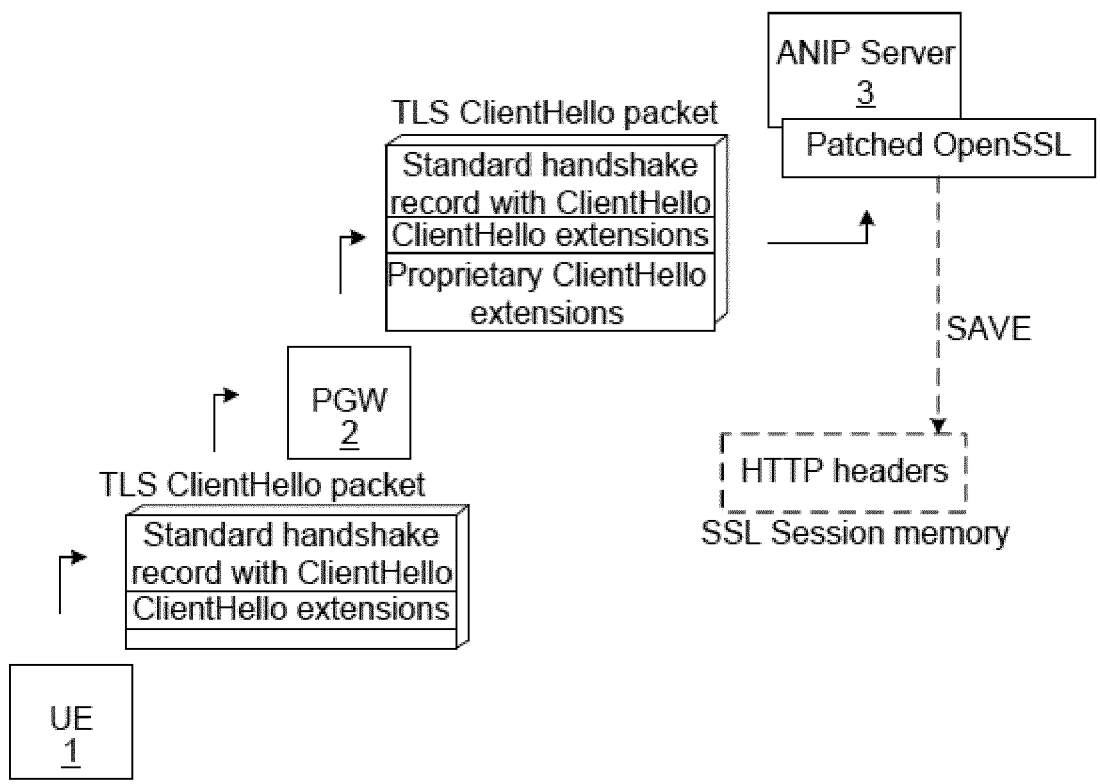
FIG. 8 is a diagram schematically illustrating TLS enrichment for uplink.
Figure 9:
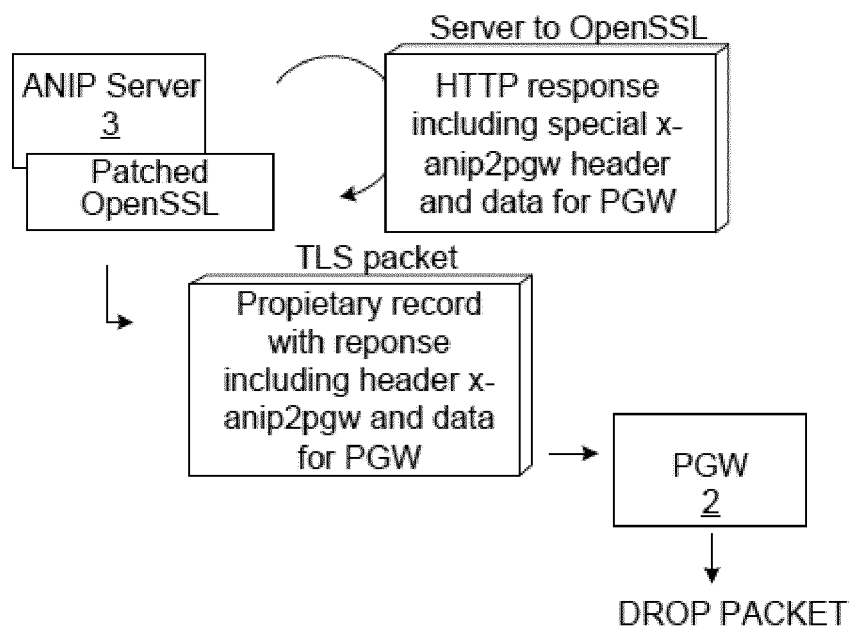
FIG. 9 is a diagram schematically illustrating TLS ANIP response for downlink.

The presented mechanism to support TLS garnering and the two-phase commit procedure is shown in FIGS. 7-9, which illustrate a PCEF based embodiment. A similar embodiment can also be attained with a traffic detection function (TDF). Two flows are thus used. The first flow is for signalling from the ANIP server to the PGW and it's not important for the UE to receive anything therein. The second flow is used as confirmation.

A sequence diagram according to an example is shown in FIG. 7. Steps 1-31 are explained in the following.

In steps 1-3 an IP-connectivity access network (CAN) session is established in PGW 2. In step 1 the PGW 2 requests policy and charging rules from the PCRF 5, by sending e.g. MSISDN and IMSI via interface GC credit control request (CCR) initialisation. In step 2 the PCRF 5 activates the corresponding PCC rules. In step 3 the PCRF 5 returns the PCC rules for a target app traffic. An Access Control Group (ACG) is equivalent to the PCC rule base in the 3GPP standard, representing an aggregate set of ACRs. A named PCC rule base can be mapped to one or more ACGs. The properties of an ACG, installed and activated for a user session, may be combined with the configured properties of the selected ACR, controlling a particular user session.

In step 4 when a user opens a target application (with ANIP support), the ANIP client 1 triggers an ANIP signalling request message to an ANIP server 3 (a TLS ClientHello message including a generic SNI extension, e.g. anip-server-sni). Other parts of transmission control protocol (TCP) and TLS handshake are not shown in the sequence diagram for simplicity purposes.

In step 5, after the TLS handshake is finished, the ANIP client 1 triggers an HTTPS GET request message to the ANIP server 3, including the application-identifier (e.g. as a parameter appended to the URL).

In steps 6 and 7 the ANIP server 3 authorizes the request (e.g. application-identifier is valid) and triggers an HTTPS redirection message (Alt-Svc or 3xx) back to the ANIP client 1, to a unique SNI corresponding to the application provider (e.g. anipA3uP237). This redirection from a top or global ANIP server to a provider-specific or local ANIP server (which in the figure is the same box for simplicity) is to simplify ANIP client configuration, i.e. to avoid the ANIP Client to be configured with the provider-specific ANIP Server.

In step 8 the ANIP client 1 triggers a new TLS connection to the ANIP server 3 with a TLS SNI equal to the value indicated in the previous redirect message (anipA3uP237). Other TCP and TLS handshake are not shown in the sequence diagram for simplicity purposes.

In step 9 the PGW 2 detects ANIP signalling (TLS ClientHello message with a certain SNI) and performs TLS content enrichment (CE) (with parameters like MSISDN or anip-version). The PGW 2 applies content enrichment only for this second TLS connection as the PGW 2 has pre-configured the SNI for this application (anipA3uP237). This content enrichment is applied for the TLS ClientHello message by adding a new (configurable) TLS extension.

In step 10 the PGW 2 sends the updated or content enriched TLS ClientHello with the proprietary TLS extension to the ANIP server 3.

In step 11 the ANIP server 3 calls to an openSSL library to retrieve the enriched parameters from the TLS extension and stores them for later use.

In steps 12 and 13, after the TLS exchange is finished (not illustrated for simplicity purposes), the ANIP client 1 triggers an HTTPS GET request message towards the ANIP Server 3, and sent via the PGW 2.

In step 14, the HTTPS GET message is received in the ANIP server 3. The ANIP server 3 decrypts the message and adds the stored CE parameters, authorizes the request, and sends a response with application classification rules (anip-basic-rule-block) and copies the CE parameters.

In step 15 the ANIP server 3 triggers an ANIP response (HTTP 200 OK over TLS) including the classification rules for the target application (in anip-basic-rule-block). The ANIP server 3 also copies the parameters CE stored at Step 11, although these parameters are not needed as the PGW 2 will not forward this 200 OK message to the UE. Additionally, the ANIP server 3 sends the response to OpenSSL to create a proprietary TLS record, which the PGW 2 can read.

In step 16 the PGW 2 retrieves the classification rules for the target application (from anip-basic-rule-block) and activates them to detect traffic for that application in this specific user session. The anip-basic-rule-block includes the application identifier and the classification rules to detect the target application. A timer is setup to expire for the application identifier at the currently applicable TTL.

In steps 17 and 18, as the ANIP client 1 can't understand this proprietary TLS record, the PGW 2 drops the HTTPS 200 OK message and triggers TCP RST towards ANIP client 1 and ANIP server 3. The PGW 2 triggering the TCP RST connection may alternatively be applied by the ANIP server 3 adding a flag indicating (ANIP Web Server to ANIP Server OpenSSL HTTPheader2TLSRecord) to the PGW 2 when this TCP RST should apply (e.g. to avoid PGW 2 to stop the redirection HTTP response. A redirection HTTP response may be an HTTP response code 302, where an HTTP redirection is triggered. This error code is returned for an HTTP server to an HTTP client indicating that a webpage redirection will be applied.

In step 19, in an asynchronous way (i.e. not based on UE reception of the TCP RST in steps 17 and 18), ANIP client 1 opens a new TLS connection (to a different port as compared with the first TLS connection in step 4).

In steps 20 and 21 the PGW 2 detects ANIP signalling (TLS ClientHello message with a certain SNI) and performs TLS CE. The CE is applied for the TLS ClientHello message by adding a new configurable TLS extension.

In step 22 the ANIP server 3 calls to openSSL library to retrieve the enriched parameters and stores them for later use. The previously stored enriched parameters (at step 11) are removed and replaced by these ones.

In steps 23 and 24, after the TLS exchange is finished (not illustrated simplicity purposes), the ANIP client 1 triggers an HTTPS GET request message towards the ANIP server 3.

In step 25 the HTTPS GET message is received in the ANIP server 3 and the ANIP server 3 authorizes the request, similarly as in step 14.

In steps 26 and 27 the ANIP server 3 triggers an ANIP response (HTTP 200 OK over TLS) and copies the parameters stored in step 22. The classification rules for the target application (i.e. anip-basic-rule-block might also be included) may also be added. The information may be included as headers (in the HTTP 200 OK message before TLS processing) and also in the HTTP 200 OK body for easier UE consumption.

In steps 28, 29 and the PGW 2 triggers TCP Finished (FIN) towards endpoints ANIP client 1 and ANIP server 3.

In step 31 The OTT application in the UE starts application traffic, which is detected by PGW 2 based on the classification rules earlier retrieved, and PGW 2 performs the corresponding enforcement actions (e.g. zero-rating).

FIGS. 8 and 9 illustrate the transformation of TLS packets, explained in steps 2-5 in greater detail from the packet structure perspective and how OpenSSLlibrary is called.

When the UE 1, in the uplink, sends a TLS ClientHello packet to the PGW 2, it is a standard handshake record with ClientHello extensions. When the PGW 2 forwards the TLS ClientHello packet to the ANIP server 3, proprietary ClientHello extensions have been added. The ANIP server 3 saves the HTTP headers in an SSL session memory.

In the downlink, the ANIP server 3 stores the HTTP response for the PGW 2 in OpenSSL, and sends the TLS packet to the PGW 2. The TLS packet has a proprietary record with the response. The PGW 2 drops the received packets, such that the UE 1 will resend a TLS ClientHello packet.

Figure 10:
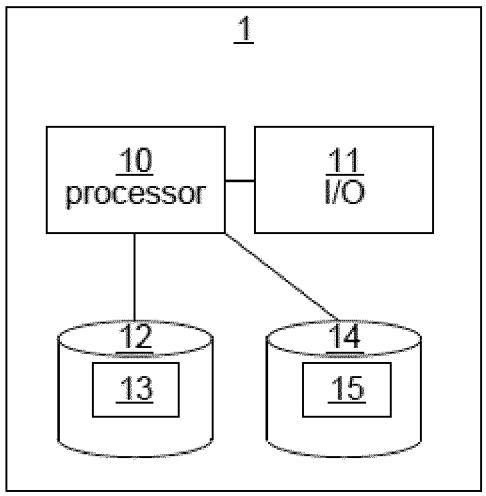
FIGS. 10-12 are diagrams schematically illustrating some components of devices presented herein.

According to an aspect an embodiment of an application client for OTT management in a communication network is presented with reference to FIG. 10. The application client 1 comprises a processing circuitry 10 and a computer program product 12, 13 storing instructions 14, 15. The instructions, when executed by the processing circuitry, causes the application client to send a request for an ANIP service to a PGW, wherein the request is addressed to a global ANIP server, receive an indication of an address to a local ANIP server for the requested ANIP service from the PGW, and resend the request for the ANIP service to the PGW. The request is addressed to the local ANIP server.

The request may be an HTTPS request message.

The request may comprise a TLS ClientHello with a generic SNI extension.

The received address to the local ANIP server may comprise an HTTPS redirection message to a unique SNI corresponding to an application provider.

FIG. 10 is a schematic diagram showing some components of the client application 1. The processing circuitry 10 may be provided using any combination of one or more of a suitable central processing unit, CPU, multiprocessing circuitry, microcontroller, digital signal processing circuitry, DSP, application specific integrated circuit etc., capable of executing software instructions of a computer program 14 stored in a memory. The memory can thus be considered to be or form part of the computer program product 12. The processing circuitry 10 may be configured to execute methods described herein with reference to FIG. 2.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the application client 1.

The application client 1 may further comprise an input/output (I/O) interface 11 including e.g. a user interface. The application client 1 may further comprise a receiver configured to receive signalling from other nodes, and a transmitter configured to transmit signalling to other nodes (not illustrated). Other components of the application client 1 are omitted in order not to obscure the concepts presented herein.

Figure 13:
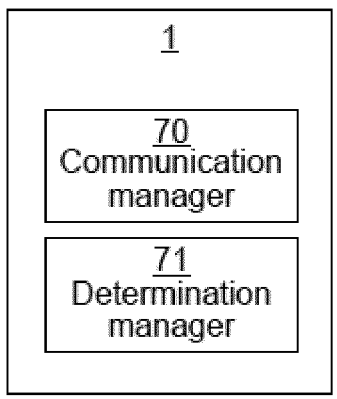
FIGS. 13-15 are diagrams schematically illustrating functional modules of devices presented herein.

According to an aspect, an embodiment of an application client 1 for OTT management in a communication network is presented with reference to FIG. 13. The application client 1 comprises a communication manager 70 for sending a request for an ANIP service to a PGW, wherein the request is addressed to a global ANIP server, receiving an indication of an address to a local ANIP server for the requested ANIP service from the PGW, and for resending the request for the ANIP service to the PGW, wherein the request is addressed to the local ANIP server. The application client 1 may also comprises a determination manager 71 for handling internal processes.

FIG. 13 is a schematic diagram showing functional blocks of the application client 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the process blocks in the method illustrated in FIG. 2, comprising a communication manager unit 70, and may further comprise a determination manger unit 71. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manager 70 is for OTT management in a communication network. This module corresponds to the processing blocks S100, S110 and S120 of FIG. 2. This module can e.g. be implemented by the processing circuitry 10 of FIG. 10, when running the computer program.

According to an aspect, an embodiment of a computer program 14, 15 for OTT management in a communication network is presented with reference to FIG. 10. The computer program comprises computer program code which, when run in an application program 1 of a communication network, causes the application program to send a request for an ANIP service to a PGW, wherein the request is addressed to a global ANIP server, receive an indication of an address to a local ANIP server for the requested ANIP service from the PGW, and to resend the request for the ANIP service to the PGW, wherein the request is addressed to the local ANIP server.

Figure 11:
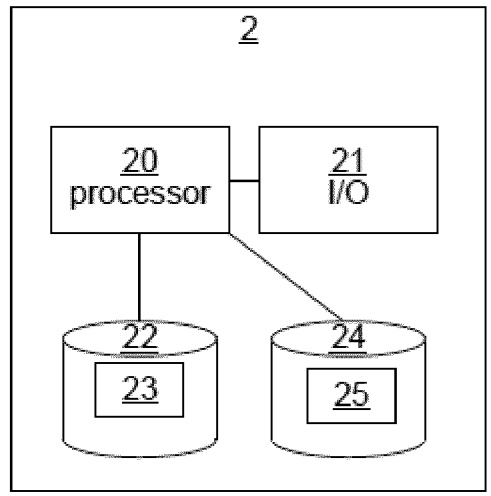

According to an aspect a PGW for OTT management in a communication network is presented with reference to FIG. 11. The PGW 2 comprises a processing circuitry 20 and a computer program product 22, 23 storing instructions 24, 25. The instructions, when executed by the processing circuitry, causes the PGW to receive a request for an ANIP service from an application client, send the received request to a global ANIP server, wherein the request is extended with a PLMN identity, receive an address to a local ANIP server from the global ANIP server, and to send the received address to the local ANIP server to the application client.

The received request may be an HTTPS request message.

The request may comprise a TLS ClientHello with a generic SNI extension.

The received address to the local ANIP server may comprise an HTTPS redirection message to a unique SNI corresponding to an application provider.

The received request may be addressed to the global ANIP server.

FIG. 10 is a schematic diagram showing some components of the PGW 2. The processing circuitry 20 may be provided using any combination of one or more of a suitable central processing unit, CPU, multiprocessing circuitry, microcontroller, digital signal processing circuitry, DSP, application specific integrated circuit etc., capable of executing software instructions of a computer program 24 stored in a memory. The memory can thus be considered to be or form part of the computer program product 22. The processing circuitry 20 may be configured to execute methods described herein with reference to FIG. 3.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 23 in the form of a data memory may also be provided, e.g. for reading and/or storing data during execution of software instructions in the processing circuitry 20. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 25, to improve functionality for the PGW 2.

The PGW 2 may further comprise an input/output (I/O) interface 21 including e.g. a user interface. The PGW 2 may further comprise a receiver configured to receive signalling from other nodes, and a transmitter configured to transmit signalling to other nodes (not illustrated). Other components of the PGW 2 are omitted in order not to obscure the concepts presented herein.

Figure 14:
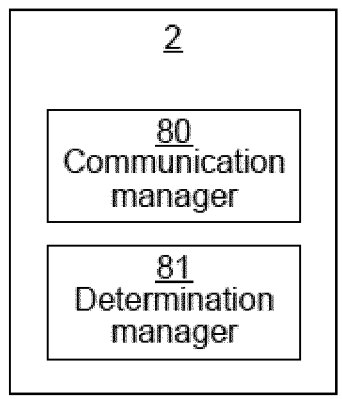

According to an aspect, an embodiment of a PGW 2 for OTT management in a communication network is presented with reference to FIG. 14. The PGW 2 comprises a communication manager 70 for receiving a request for an ANIP service from an application client, sending the received request to a global ANIP server, wherein the request is extended with a PLMN identity, receiving an address to a local ANIP server from the global ANIP server, and for sending the received address to the local ANIP server to the application client. The PGW 2 may also comprises a determination manager 81 for handling internal processes.

FIG. 14 is a schematic diagram showing functional blocks of the PGW 2. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the process blocks in the method illustrated in FIG. 3, comprising a communication manager unit 80, and may further comprise a determination manger unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manager 80 is for OTT management in a communication network. This module corresponds to the processing blocks S200, S210, S220 and S230 of FIG. 3. This module can e.g. be implemented by the processing circuitry 20 of FIG. 11, when running the computer program.

According to an aspect an embodiment of a computer program for OTT management in a communication network is presented with reference to FIG. 11. The computer program comprises computer program code which, when run in a PGW of a radio communication network, causes the PGW 2 to receive a request for an ANIP service from an application client, send the received request to a global ANIP server, wherein the request is extended with a PLMN identity, receive an address to a local ANIP server from the global ANIP server, and to send the received address to the local ANIP server to the application client.

Figure 12:
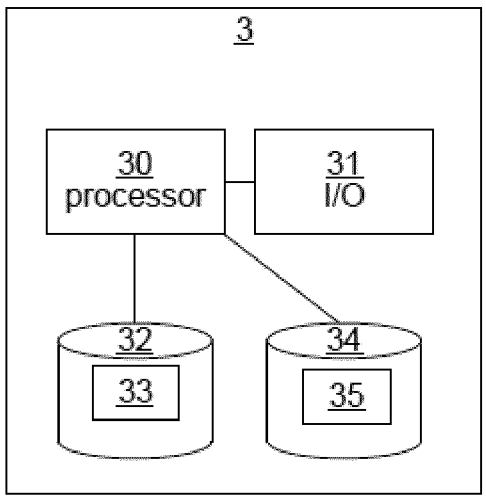

According to an aspect an ANIP server for OTT management in a communication network is presented with reference to FIG. 12. The ANIP server 3 comprises a processing circuitry 30 and a computer program product 32, 33 storing instructions 34, 35. The instruction, when executed by the processing circuitry, causes the ANIP server to receive a request for an ANIP service from a PGW, the request extended with a PLMN identity, authorize the request, and to send an indication of an address to a local ANIP server for the ANIP service to the PGW, in response to the received request.

The received request may be an HTTPS request message.

The indication of the address to the local ANIP server may comprise an HTTPS redirection message to a unique SNI corresponding to an application provider.

FIG. 12 is a schematic diagram showing some components of the ANIP server 3. The processing circuitry may be provided using any combination of one or more of a suitable central processing unit, CPU, multiprocessing circuitry, microcontroller, digital signal processing circuitry, DSP, application specific integrated circuit etc., capable of executing software instructions of a computer program 34 stored in a memory. The memory can thus be considered to be or form part of the computer program product 32. The processing circuitry 10 may be configured to execute methods described herein with reference to FIG. 4.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 33 in the form of a data memory may also be provided, e.g. for reading and/or storing data during execution of software instructions in the processing circuitry 30. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 35, to improve functionality for the ANIP server 3.

The ANIP server 3 may further comprise an input/output (I/O) interface 31 including e.g. a user interface. The ANIP server 3 may further comprise a receiver configured to receive signalling from other nodes, and a transmitter configured to transmit signalling to other nodes (not illustrated). Other components of the ANIP server 3 are omitted in order not to obscure the concepts presented herein.

Figure 15:
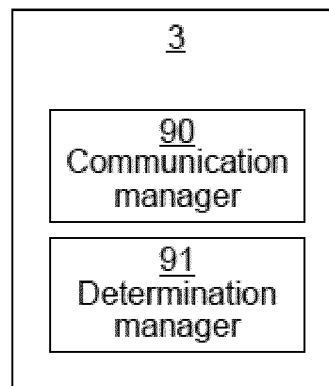

According to an aspect, an embodiment of an ANIP server 3 for OTT management in a communication network is presented with reference to FIG. 15. The ANIP server 3 comprises a communication manager 90 for receiving a request for an ANIP service from a PGW, the request extended with a PLMN identity, and for sending an indication of an address to a local ANIP server for the ANIP service to the PGW, in response to the received request. The ANIP server 3 also comprises a determination manager 91 for authorizing the request.

FIG. 15 is a schematic diagram showing functional blocks of the ANIP server 3. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the process blocks in the method illustrated in FIG. 4, comprising a communication manager unit 90, and a determination manger unit 91. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manager 90 is for OTT management in a communication network. This module corresponds to the processing blocks S300 and S320 of FIG. 4. This module can e.g. be implemented by the processing circuitry 30 of FIG. 12, when running the computer program.

The determination manager 91 is for OTT management in a communication network. This module corresponds to the processing block S310 of FIG. 4. This module can e.g. be implemented by the processing circuitry 30 of FIG. 12, when running the computer program.

According to an aspect an embodiment of a computer program for OTT management in a communication network is presented with reference to FIG. 12. The computer program comprises computer program code which, when run in an ANIP server of a radio communication network, causes the ANIP server 3 to receive a request for an ANIP service from a PGW the request extended with a PLMN identity, authorize the request, and to send an indication of an address to a local ANIP server for the ANIP service to the PGW, in response to the received request.

A computer program product 12, 13, 22, 23, 32, 33 comprising a computer program 14, 15, 24, 25, 34, 35 and a computer readable storage means on which the computer program is stored is also presented.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A method for over-the-top (OTT) management in a communication network, the method comprising:
   receiving an application network interaction protocol (ANIP) request for an ANIP service, wherein the ANIP request was transmitted by a client device and the ANIP request is addressed to a global ANIP server;
   adding to the received ANIP request a public land mobile network (PLMN) identity, thus creating an extended ANIP request comprising the PLMN identity;
   sending the extended ANIP request to the global ANIP server;
   receiving an ANIP response message responsive to the extended ANIP request, wherein the ANIP response message was transmitted by the global ANIP server and comprises an address for a local ANIP server; and
   sending to the client device the received ANIP response message comprising the address for the local ANIP server.

2. The method according to claim 1, wherein the received ANIP request is a hypertext transfer protocol secure (HTTPS) request message.

3. The method according to claim 1, wherein the ANIP request comprises a transport layer security (TLS) ClientHello with a generic server name identification (SNI) extension.

4. The method according to claim 1, wherein the received address to the local ANIP server comprises an HTTPS redirection message to a unique SNI corresponding to an application provider.

5. The method according to claim 1, further comprising:
   after sending the ANIP response message to the client device, receiving from the client device a policy activation request message;
   extending the received policy activation request message to include a subscription policy; and
   using the address for the local ANIP server, sending to the local ANIP server the extended policy activation request message comprising the subscription policy.

6. A method for over-the-top (OTT) management in a communication network, the method comprising:
   a client sending to a packet data network gateway (PGW) a first application network interaction protocol (ANIP) request for an ANIP service, wherein the ANIP request is addressed to a global ANIP server;
   the client receiving from the PGW an ANIP response responsive to the ANIP request, the ANIP response comprising an indication of an address to a local ANIP server for the requested ANIP service; and
   after receiving the ANIP response, the client sending to the PGW a policy activation request addressed to the local ANIP server and comprising an application service plan identifier (asp-id) and/or an application identifier (app-id), wherein the policy activation request requests activation of an applicable policy for the asp-id and/or app-id.

7. The method according to claim 6, wherein the first ANIP request is a first hypertext transfer protocol secure (HTTPS) request message.

8. The method according to claim 6, wherein the first ANIP request comprises a transport layer security (TLS) ClientHello with a generic server name identification (SNI) extension.

9. The method according to claim 6, wherein the ANIP response comprises an HTTPS redirection message to a unique SNI corresponding to an application provider.

10. A method for over-the-top (OTT) management in a communication network, the method comprising:

a global application network interaction protocol (ANIP) server receiving an extended ANIP request generated by a packet data network gateway (PGW), the extended ANIP request comprising: i) an ANIP request for an ANIP service, wherein the ANIP request was generated by a client device, and ii) a public land mobile network (PLMN) identity;

the global ANIP server authorizing the request; and the global ANIP server sending to the PGW an ANIP response responsive to the extended ANIP request, the ANIP response comprising an indication of an address for a local ANIP server for the ANIP service.

11. The method according to claim 10, wherein the ANIP request is a hypertext transfer protocol secure (HTTPS) request message.

12. The method according to claim 10, wherein the ANIP response comprises an HTTPS redirection message to a unique SNI corresponding to an application provider.

13. A packet data network gateway (PGW) for over-the-top (OTT) management in a communication network, the PGW comprising:

processing circuitry; and memory storing instructions that, when executed by the processing circuitry, causes the PGW to perform a process that comprises:

receiving an application network interaction protocol (ANIP) request for an ANIP service, wherein the ANIP request was transmitted by a client device and the ANIP request is addressed to a global ANIP server;

adding to the received ANIP request a public land mobile network (PLMN) identity, thus creating an extended ANIP request comprising the PLMN identity;

sending the extended ANIP request to the global ANIP server;

receiving an ANIP response message responsive to the extended ANIP request, wherein the ANIP response message was transmitted by the global ANIP server and comprises an address for a local ANIP server; and sending to the client device the received ANIP response message comprising the address for the local ANIP server.

14. The PGW according to claim 13, wherein the received ANIP request is a hypertext transfer protocol secure (HTTPS) request message.

15. The PGW according to claim 13, wherein the ANIP request comprises a transport layer security (TLS) ClientHello with a generic server name identification, SNI, extension.

16. The PGW according to claim 13, wherein the received address to the local ANIP server comprises an HTTPS redirection message to a unique SNI corresponding to an application provider.

17. The PGW according to claim 13, wherein the process further comprises:

after sending the ANIP response message to the client device, receiving from the client device a policy activation request message;

extending the received policy activation request message to include a subscription policy; and using the address for the local ANIP server, sending to the local ANIP server the extended policy activation request message comprising the subscription policy.

18. An application client for over-the-top (OTT) management in a communication network, the application client comprising:

processing circuitry; and memory storing instructions that, when executed by the processing circuitry, causes the application client to perform a process that comprises:

sending to a packet data network gateway (PGW) a first application network interaction protocol (ANIP) request for an ANIP service, wherein the ANIP request is addressed to a global ANIP server;

receiving from the PGW an ANIP response responsive to the ANIP request, the ANIP response comprising an indication of an address to a local ANIP server for the requested ANIP service; and after receiving the ANIP response, sending to the PGW a policy activation request addressed to the local ANIP server and comprising an application service plan identifier (asp-id) and/or an application identifier (app-id), wherein the policy activation request requests activation of an applicable policy for the asp-id and/or app-id.

19. The application client according to claim 18, wherein the request is a hypertext transfer protocol secure (HTTPS) request message.

20. The application client according to claim 18, wherein the request comprises a transport layer security (TLS) ClientHello with a generic server name identification, SNI, extension.

21. The application client according to claim 18, wherein the received address to the local ANIP server comprises an HTTPS redirection message to a unique SNI corresponding to an application provider.

22. An application network interaction protocol (ANIP) server for over-the-top (OTT) management in a communication network, the ANIP server comprising:

processing circuitry; and memory storing instructions that, when executed by the processing circuitry, causes the ANIP server to perform a process that comprises:

receiving an extended ANIP request generated by a packet data network gateway (PGW), the extended ANIP request comprising: i) an ANIP request for an ANIP service, wherein the ANIP request was generated by a client device, and ii) a public land mobile network (PLMN) identity;

authorizing the request; and sending to the PGW an ANIP response responsive to the ANIP request, the ANIP response comprising an indication of an address for a local ANIP server for the ANIP service.

23. The ANIP server according to claim 22, wherein the received request is a hypertext transfer protocol secure (HTTPS) request message.

24. The ANIP server according to claim 22, wherein the indication of the address to the local ANIP server comprises an HTTPS redirection message to a unique SNI corresponding to an application provider.

25. The method of claim 1, further comprising:

prior to receiving the ANIP request, obtaining a subscription policy associated with a subscription identity stored in the client device;

after sending the ANIP response message to the client device, receiving from the client device a policy activation request message;

extending the received policy activation request message to include the subscription policy; and using the address for the local ANIP server, sending to the local ANIP server the extended policy activation request message comprising the subscription policy.

26. The method of claim 10, further comprising:
prior to sending the indication of the address for the local ANIP server, selecting the address based on the PLMN identity.

* * * * *